(12) United States Patent
Müller et al.

(10) Patent No.: US 6,648,541 B1
(45) Date of Patent: Nov. 18, 2003

(54) JOINING ELEMENT FOR BRIDGING THE SEPARATING AREA OF A DIVIDED SEAL IN CABLE FITTINGS

(75) Inventors: Thorsten Müller, Menden (DE); Rainer Zimmer, Schalksmühle (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 09/787,146

(22) PCT Filed: Jul. 1, 1999

(86) PCT No.: PCT/DE99/01945

§ 371 (c)(1),
(2), (4) Date: May 4, 2001

(87) PCT Pub. No.: WO00/16458

PCT Pub. Date: Mar. 23, 2000

(30) Foreign Application Priority Data

Sep. 16, 1998 (DE) .......................... 198 42 422

(51) Int. Cl.⁷ .............................. F16D 1/00; F16G 11/00

(52) U.S. Cl. ................... 403/286; 403/293; 403/341; 52/698; 277/645

(58) Field of Search ............................... 403/286, 287, 403/292, 293, 294, 297, 341, 353; 52/726.1, 698; 277/644, 645

(56) References Cited

U.S. PATENT DOCUMENTS

| | | | | |
|---|---|---|---|---|
| 559,168 A | * | 4/1896 | Evans | 403/272 |
| 4,140,417 A | * | 2/1979 | Danielsen et al. | 403/293 |
| 4,457,522 A | * | 7/1984 | Trieste et al. | 277/645 |
| 4,522,413 A | * | 6/1985 | Nicholas | 277/645 |
| 6,331,090 B1 | * | 12/2001 | Rene | 403/286 |

FOREIGN PATENT DOCUMENTS

| JP | 01226954 A | * | 9/1989 | 52/698 |
|---|---|---|---|---|

* cited by examiner

Primary Examiner—Lynne H. Browne
Assistant Examiner—Jori Schiffman

(57) ABSTRACT

The invention relates to a joining element (VE), consisting of a fixing component (FT) and a closing component (VT), for the ends (DE1, DE2) of a divided seal (D) in sealing systems in cable fittings.

11 Claims, 3 Drawing Sheets

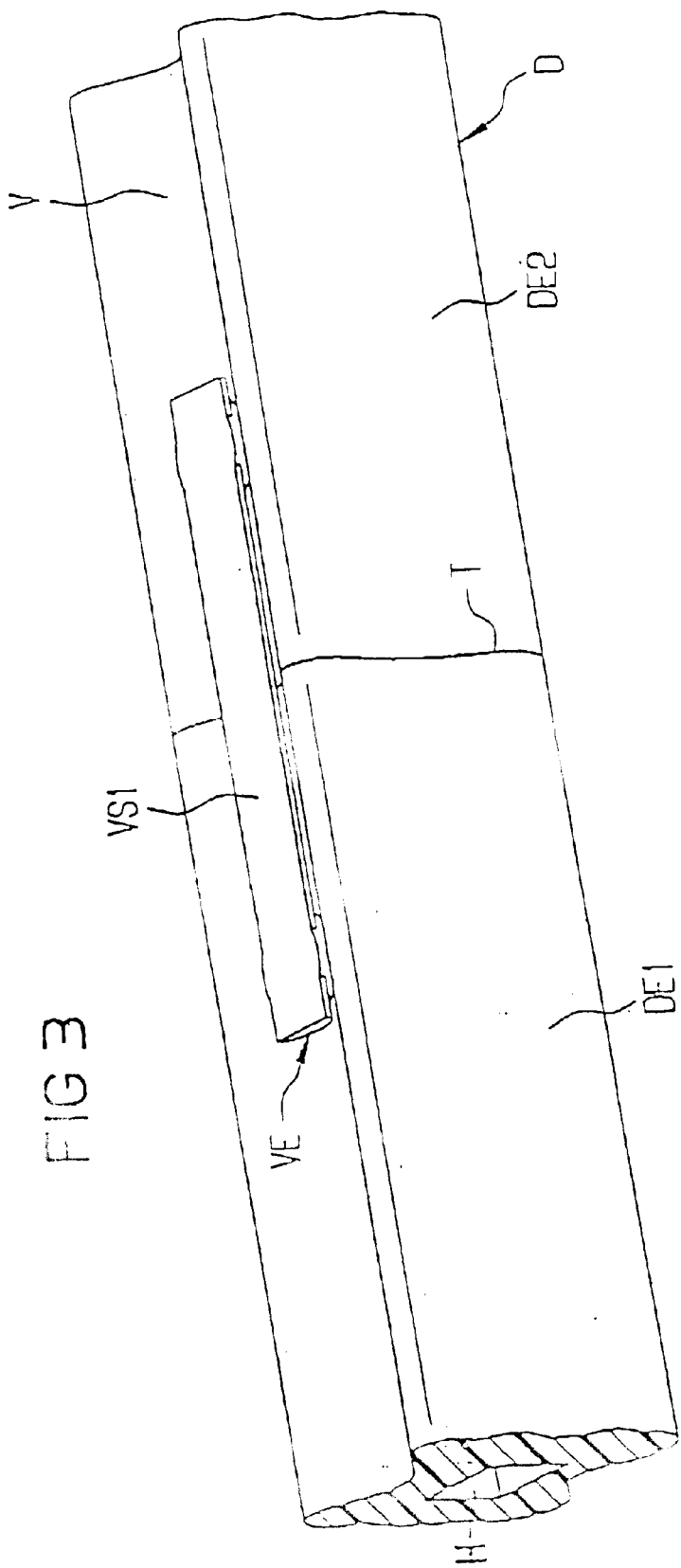

JOINING ELEMENT FOR BRIDGING THE SEPARATING AREA OF A DIVIDED SEAL IN CABLE FITTINGS

The invention relates to a joining element for bridging the separating area of a divided seal in a cable fitting.

From the European Patent document 0 443 118 B1, a divided sealing washer made of plastic and being provided for a sealing body in a cable fitting is known. Said divided sealing washer consists of an elastic tube comprising, at the seal ends, a joining element bridging the separating area and being positioned inside the sealing washer. The joining element is formed from two corresponding coupling members engaging with each other and being backwards offset inside the sealing washer. When being joined, the dividing faces of the sealing washer are pressed together; wherein a tight fit of the coupling members inside the sealing washer must be guaranteed for this purpose.

The problem to be solved by the present invention consists in creating a joining element for cut seals which can be inserted in a way which is particularly favourable with regard to mounting.

According to the present invention, the posed problem is solved by means of a joining element of the above explained type and in that the joining element consists of a fixing component comprising two tube elements being positioned on a joining bar in a way to be spaced from each other by a certain distance and of a closing component comprising pins being spaced having the same distance, in that corresponding locking elements on the pins and on the tube elements are positioned for mutual engagement, and in that the distance between the pins and between the tube elements, respectively, corresponds to the distance between two receiving holes in the seal ends of the seal assembled at the separating area.

The advantage of the joining element according to the present invention consists particularly in that no adhesive agent is required for achieving the fixing. The seals used, which mostly consist of elastic plastic material such as silicone, suitable adhesive agents which guarantee sufficient fixing are particularly hard to find. Also, for elastic plastic materials, mechanical clamping is possible only under great difficulties due to the flexibility of the material. In the joining element according to the present invention, the fixing of the seal at a separating area between two ends of the seal is practically independent of the sealing material used, since the seal ends are merely mutually aligned at the separating area and are fixed in their position by means of the joining element. For this purpose, a receiving hole for the insertion of tube elements and pins, correspondingly engaging thereto, of the joining element is provided in each end of the seal. The tube elements and the pins are located on joining bars, wherein they are spaced by distances which are determined by the positions of the receiving holes, wherein the joining bars bridge the separating area of the seal. When mounting the joining element, the fixing component of the joining element is first inserted into the receiving holes of the seal ends with its tube elements, so that herewith the alignment and the mutual fit of the seal ends is performed. The locking is then performed by engagement of the closing component, wherein the pins of the closing component engage into the tube elements of the fixing component free from backlash. Profile packings or O-ring type seals are used as seals in cable fittings, in particular when a washer seal is used in a sealing region between the sealing bodies and a socket pipe. Said seals can also be provided with a longitudinally extending cavity, so as to increase the elasticity of the seal. The joining element according to the present invention is arranged at the separating area of the seal in a fashion as to be sunk-in in the seal ends, e.g. in a continuous recess of a profile packing or in a recess which is adapted to the shape of the joining element, so that the joining element does not appear as a projection. With particularly critical separating areas, wetting agents or adhesives suitable for sealing and per se known in cable fitting technology can be applied in addition.

The present invention will now be further explained in three figures, therein referring to an exemplary embodiment.

FIG. 3 shows the completely mounted separating area of the seal.

Figure 1:
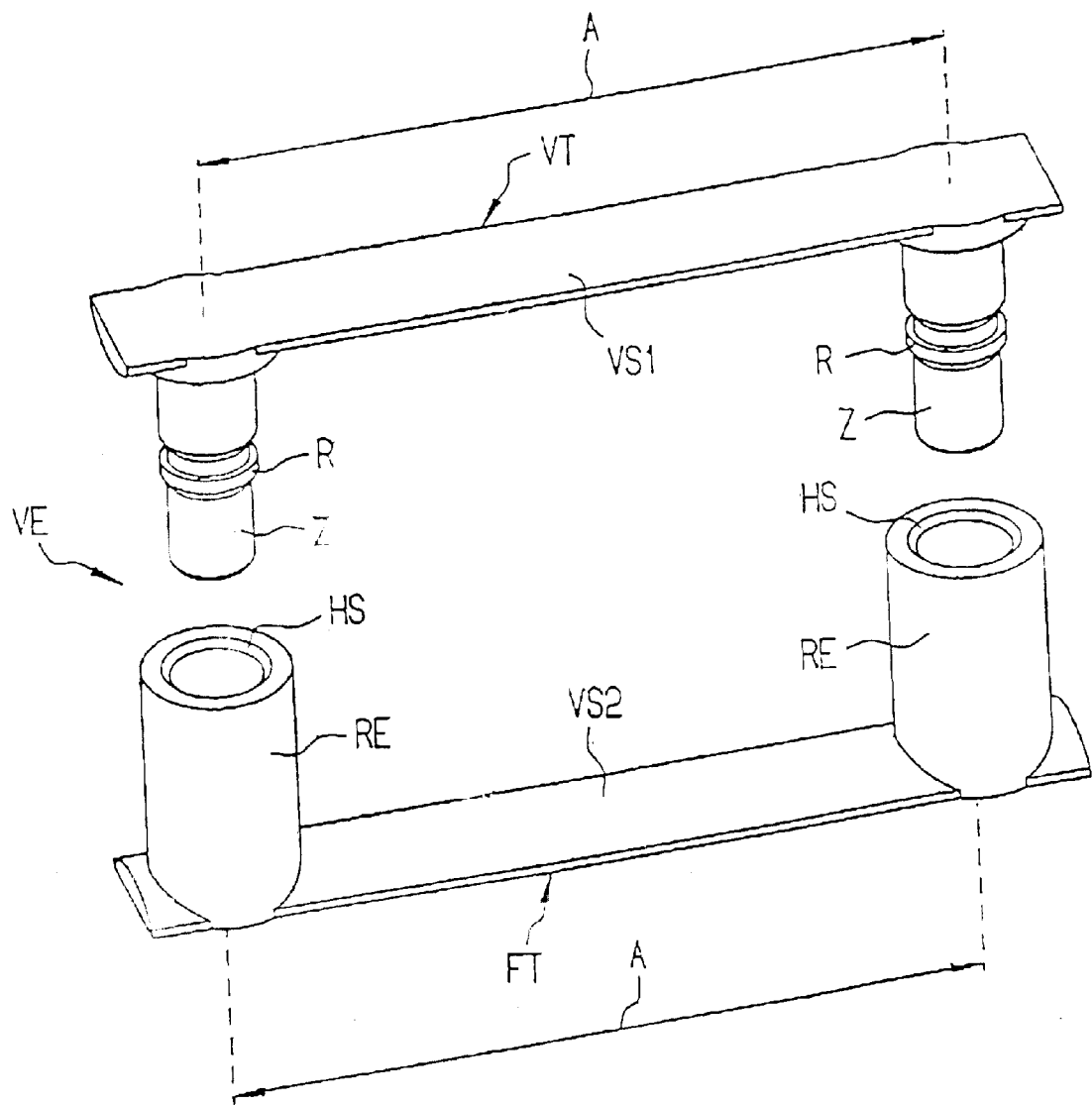
FIG. 1 shows the component parts of the joining element.

FIG. 1 illustrates the joining element VE in an unlocked state. In consists of a fixing component FT having, on a joining bar VS2, two tube elements RE as locking elements, and of a closing component VT having, on a joining bar VS1, two pins Z as corresponding locking elements. The pins Z as well as the tube elements RE are arranged at a distance A on the respective joining bar VS1 or VS2, respectively, wherein the said distance A corresponds to the distance of two receiving holes provided in the seal ends of the seal to be assembled. The diameter of said receiving holes in the seal corresponds to the outer diameter of the tube elements RE, which are inserted thereinto After the seal ends have been inserted, the seal is assembled such that its seal ends abut and that the seal ends are fixed in their positions. The closing component VT is placed on top so as to form an upper end portion of the assembled arrangement, wherein the pins engage within the tube elements RE. The locking, for example, is performed in that the pins Z are provided with locking rings R which, when the pins Z engage into the inside of the tube elements RE, get hooked in an undercut profile HS without play. The joining bars VS1 and VS2 are formed such that they fit closely when being inserted into recesses of the seal. In this exemplary embodiment, the faces of the joining bars VS1 and VS2 facing toward the seal comprise an arc-shaped formation which corresponds to the shape of the profile of the seal.

Figure 2:
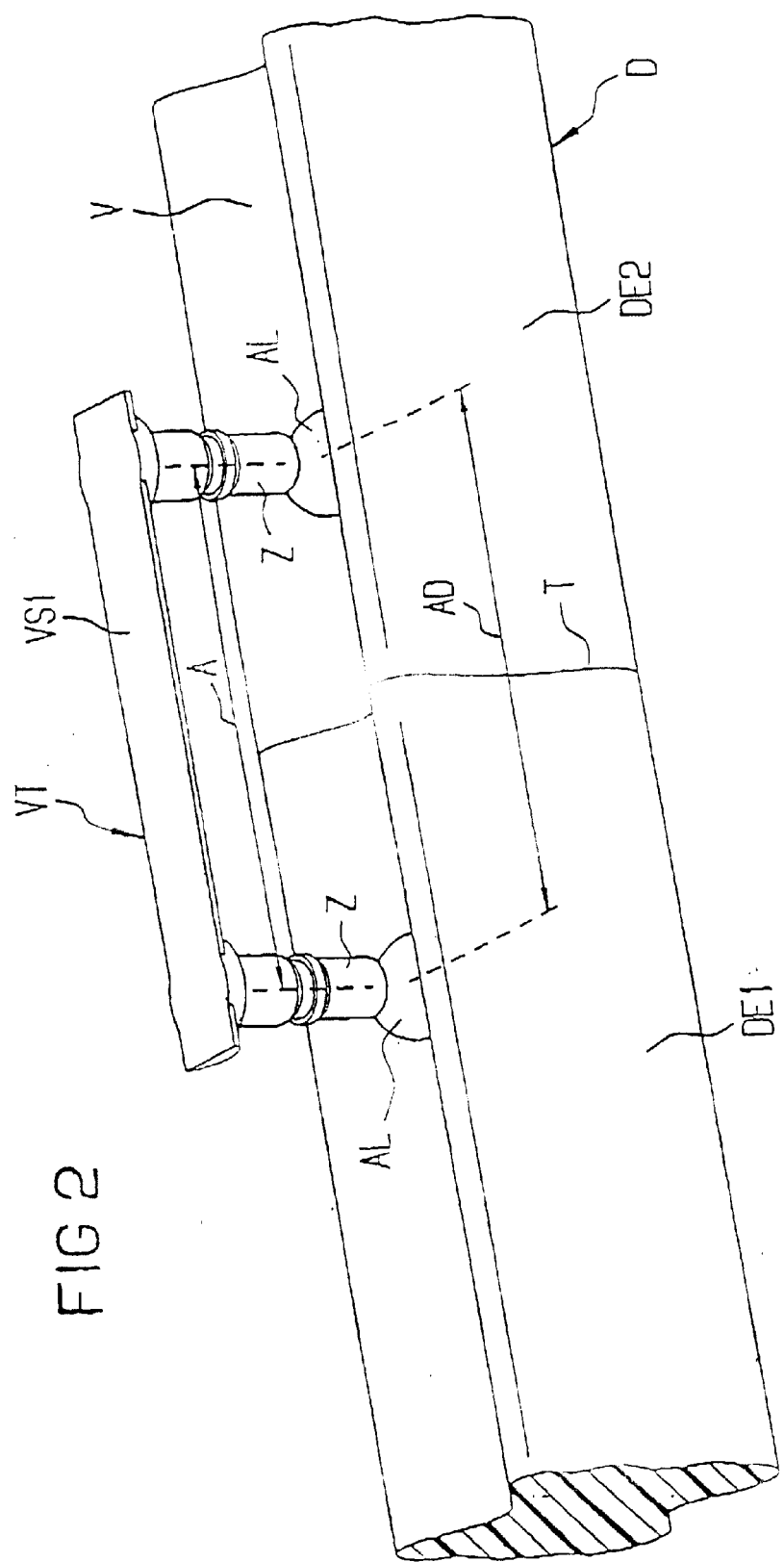
FIG. 2 shows the insertion of the closing component into the fixing component, the seal therein already being aligned.

FIG. 2 illustrates the first mounting step, in which the seal ends DE1 and DE2 of the seal D—in the present case a profile packing having a solid cross section—are already assembled at the separating area T so as to abut and are already fixed in their positions by the use of the fixing component being inserted into the receiving holes AL and being no more visible here. It is once more noted in this place that the distance AD corresponds to the distance A of the tube elements RE and of the pins Z, respectively. Here, the closing component VT is shown in a state shortly before its insertion into the tube elements, i.e. shortly before the locking of the entire system.

FIG. 3 finally shows the final state of the mounting procedure by the joining element VE, i.e. the closing component VT is sunk in and locked or engaged and hence guarantees a cohesive strength free from backlash of the ends DE1 and DE2 of the seal at the common separating area T. Further, it is obvious that the closing component VT is inserted into the recess V of the seal D and does not project from the profile of the seal, so that the subsequent fitting face of the seal is not impaired. As an alternative, it is indicated here that e.g. a seal having a longitudinally extending or lengthwise extended cavity H is used.

What is claimed is:

1. A seal for a cable fitting, comprising an elongated, crosswise divided sealing member (D) comprising sealing member ends (DE1, DE2) assigned to its separating area and being provided on two longitudinal sides facing off each other with longitudinal recesses (V) which extend in a longitudinal direction of the sealing member (D) and which open outwardly, and a joining element (VE) bridging the separating area, the joining element (VE) having a fixing component (FT) comprising two tube elements (RE) being positioned on a first joining bar (VS2) in a way to be spaced from each other by a distance (A) and of a closing component (VT) positioned on a second joining bar (VS1) comprising pins (Z) being spaced having the same distance (A), wherein the fixing component (FT) is fixed to the sealing member (D) by means of the closing component (VT), and wherein the distance (A) between pins (Z) and between the tube elements (RE), corresponds to the distance (AD) between two receiving holes (AL) in the sealing member ends (DE1, DE2) of the sealing member (D), assembled at the separating area, wherein the diameter of the tube elements (RE) is equal to the diameter of the receiving holes, and the sealing member ends (DE1, DE2) are mutually aligned by means of the tube elements (RE) of the fixing component (FT) being inserted into the receiving holes (AL) of the sealing member ends (DE1, DE2) and are fixed in a position so as to be assembled to abut free from backlash, and corresponding locking elements (R, HS) are provided on the pins (Z) and on the tube elements (RE) for mutual engagement, and the delimitation wall of the respective longitudinal recess (V) has an arc-shaped cross-section, and both the first joining bar (VS1) and the second joining bar (VS2) have an arc-shaped cross section facing toward the respective longitudinal recess (V) and corresponding to the arc-shape of the same and are inserted into the corresponding longitudinal recess (V) so as to have a positive fit with respect to their arc-shape.

2. The seal according to claim 1 wherein the locking elements provided at the pins (Z) are formed as projections.

3. The seal according to claim 2 wherein the projections are locking units (R).

4. The seal according to claim 1 wherein an undercut profile (HS) is formed in the tube elements (RE) as the locking element.

5. The seal according to claim 1 wherein the longitudinal recesses (V) in the sealing member (D) are continuous.

6. The seal according to claim 1 wherein the longitudinal recesses (V) in the sealing member (D) are restricted to the shape of the joining bars (VS1, VS2).

7. The seal according to claim 1 wherein the seal is formed as a profile packing (D).

8. The seal according to claim 1 wherein the seal is formed as an O-ring seal.

9. The seal according to claim 1 wherein the seal member (D) is provided with an elongated interior cavity (H).

10. The seal according to claim 1 wherein the sealing member (D) is made of an elastic material.

11. The seal according to claim 1 wherein a wetting or adhesive agent is applied to the sealing member ends (DE1, DE2) at the separating area (T).

* * * * *